Jan. 29, 1957  L. PETERSEN  2,779,088
TOOL FOR REMOVING BRAKE SHOE RETAINER LOCKS
Filed Dec. 30, 1950
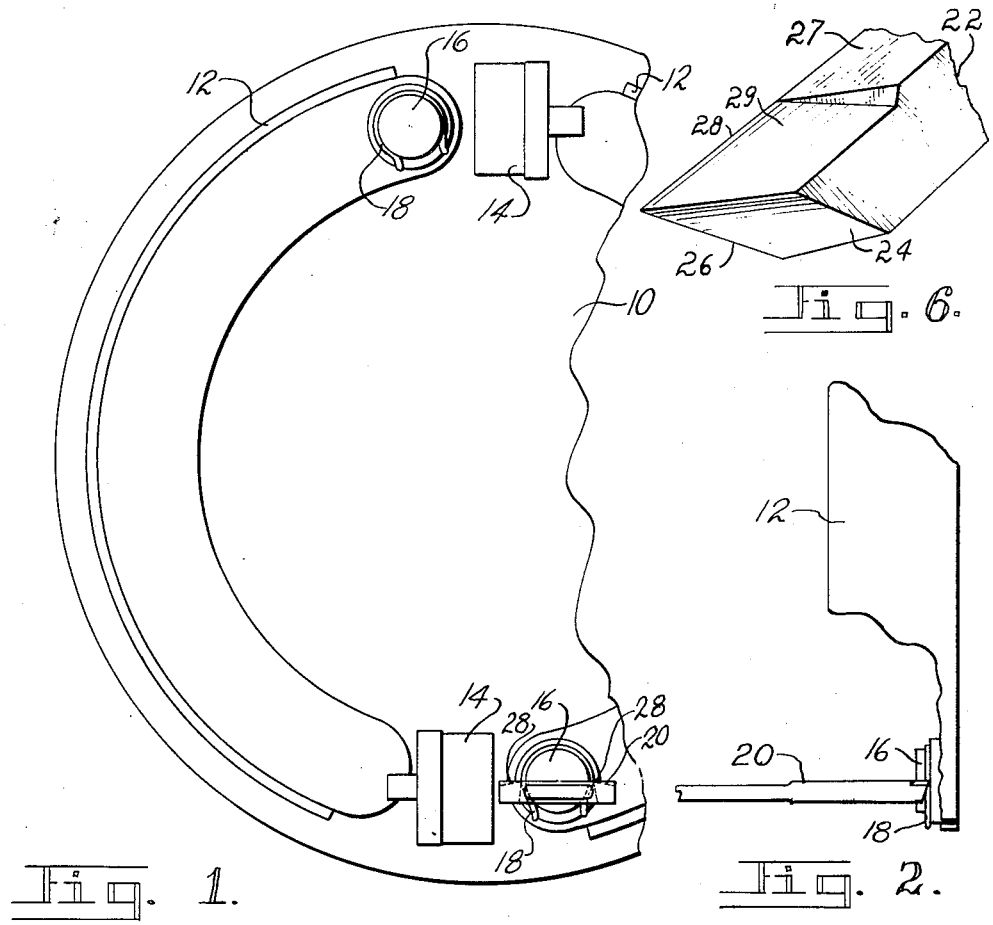
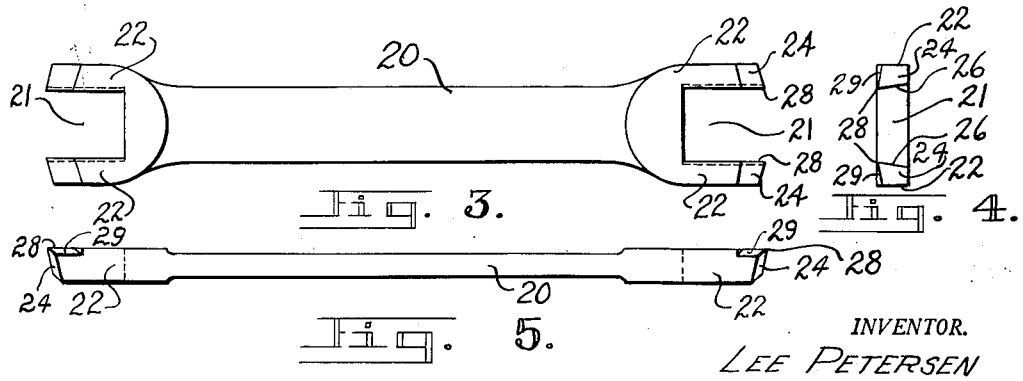
INVENTOR.
LEE PETERSEN
BY Edward M. Shealy
Attorney

United States Patent Office 2,779,088
Patented Jan. 29, 1957

2,779,088

TOOL FOR REMOVING BRAKE SHOE RETAINER LOCKS

Lee Petersen, Salt Lake City, Utah

Application December 30, 1950, Serial No. 203,580

1 Claim. (Cl. 29—229)

The present invention relates to improvements in means for removing retaining rings and more particularly this invention relates to tools useful in removing retaining rings of the so-called open type from brake shoes, such as are commonly found on automobile brake systems.

It is well known that mechanics very often crimp the brake shoe retainer locks until the two outer ends are folded tightly down into the retaining groove, and that removal of the brake shoe retainer locks is nearly impossible without mutilating or damaging the brake shoe retainer lock.

The present invention is designed to overcome this and other difficulties, and one of the objects of the present invention is to provide a suitable tool for removing brake shoe retainer locks even when the ends thereof have been tightly crimped into the retaining groove.

Another object of the present invention is to provide a tool of the character described which will have different sized openings on each end thereof, thereby providing a tool which may be used with various sizes of brake shoe retainer locks.

Still another object of the present invention is to provide a tool of the character described in which the design of the attacking edges make it unique and extremely efficient and effective in operation. The narrow width of the jaws and the ground release making it accessible for removing spring clip, brake shoe, retainer locks which are located near obstructions on the brake plate of the automobile or truck.

Still another object of the present invention is to provide a tool of the character described which can be readily disposed to engage a brake shoe retainer lock in driving relationship therewith, and which easily and rapidly removes the same when hit smartly by a hammer or other implement. In this connection, it is an object of the invention to provide a new and simple method for removing brake shoe retainer locks.

Yet another object of the present invention is to provide a tool of the aforesaid character which is relatively simple and inexpensive in construction and which is highly efficient in operation.

With the above and other objects in view as will appear as the description proceeds, the invention resides in the novel method and in the construction, combination and arrangement of parts of the special tool preferred for use in carrying out the method, as hereinafter more specifically set forth, claimed and shown in the accompanying drawings which form a part of this application for Letters Patent.

In the accompanying drawings are illustrated preferred and practical embodiments of the invention, it being understood, however, that the drawings are merely illustrative, and that the inventive-concept is susceptible of other embodiments and utilizations, and that the illustrated embodiments likewise are susceptible of a wide range of variation and modification without departing from the spirit of the invention or the scope of the appended claim.

In these drawings which accompany and form a part of this specification, and in which like reference numerals are used to designate the same or like parts throughout the several figures:

Figure 1 is a front elevational view of a portion of a conventional automobile brake arrangement showing the new and novel tool of the present invention applied to the bottom brake shoe retainer lock in order to remove the same;

Figure 2 is a side elevational view of a portion of the brake arrangement shown in Figure 1 with the brake drum partially broken away showing the tool of the present invention engaging the brake shoe retainer lock as in Fig. 1 in order to remove the same;

Figure 3 is a plan view of one form of the tool of the present invention;

Figure 4 is an end view of the tool show in Figure 3;

Figure 5 is a side elevational view of the tool shown in Figures 3 and 4; and

Figure 6 is a fragmentary perspective view drawn to an enlarged scale showing the faceted construction of one side or jaw member of one end of the tool.

Referring now in detail to the drawings, the reference numeral 10 has been used to generally designate an automotive brake assembly of conventional design. The automotive brake assembly comprises brake shoe members 12 which are actuated by the hydraulic cylinders 14. The brake shoe members 12 are pivotally secured at one end to the brake assembly by means of the shaft member 16. The outer end of the shaft member 16 has a groove (not shown) cut therein, into which is fitted a brake shoe retainer lock which has been indicated generally by the reference numeral 18. The brake shoe retainer lock serves to hold the brake shoe 12 in place, thus preventing the brake shoe 12 from slipping off the shaft member 16, as is shown most clearly in Figure 1.

The new and novel tool of the present invention has been indicated by the reference numeral 20 and it is designed to facilitate the removal of the brake shoe retainer locks 18 from the groove in the shaft 16 to best advantage in accordance with my method. If desired, the tool 20 may be made in the same shape and general configuration of the conventional open end wrench, the two ends thereof being of similar design but of different sizes or widths between the side jaws thereof, thus enabling the user to use the same tool for removing different size retainer locks 18. Since opposite ends of the tool are of substantially similar design, the following description will be made in regard to one end of the tool only, it being understood that the same description will also apply to the other end of the tool 20. It will also be understood, of course, that the tool may be made in a variety of sizes and shapes, for example, the tool may consist of a single ended portion instead of a double-ended portion, the single-ended portion having a suitable handle member affixed thereto. The tool may be made from metal or any other suitable material.

As illustrated, opposite ends of the tool 20 are formed as flat, U-shaped, driving heads provided with longitudinally directed elongated slots 21 having parallel side walls or members 22. The terminal end faces 24 of the slot-defining, side wall members 22 are beveled rearwardly, see particularly Figs. 5 and 6. This enables the tool to be easily and conveniently positioned for driving action relative to the comparatively thin retainer lock 18, which is to be driven off in accordance with my method. The angle of bevel is preferably from about 10 to 20 degrees. The mutually opposing and confronting inner faces 26 of the side wall members 22 are beveled outwardly to provide sharp attacking edges 28 and leeway for spring clip expansion during removal thereof, from 5 to 15 degrees of bevel having been found to give very satisfactory results. To enhance the sharpness of these edges 28, terminal end portions of the flat front faces 27 of the side wall members 22 are also beveled, as at 29, backwardly from the slot-adjacent edge 23, the angle made with the inner faces 26 preferably being from 60 to 70 degrees. These three bevels or facets 24, 26, and 29 of the free, terminal end portions of the side wall members 22 are shown most clearly in Figs. 3, 4, and 5, where it can be seen that the attacking edges 28 of the tool are disposed most advantageously for digging into the sides of the thin retainer lock 18, Fig. 2, regardless of whether or not the tool is held in precise perpendicular relationship thereto, as illustrated in Fig. 2.

The particular construction described provides a new and novel tool which very effectively enables the user to remove brake shoe retainer locks quickly and easily with a minimum of effort and also provides a construction by means of which the tool may be used to remove brake shoe retainer locks which are located near obstructions such as often occur in the conventional automotive brake plate assembly.

The use and operation of the new and novel tool of the present invention has been shown most clearly in Figures 1 and 2. It may be noted from these figures that the tool 20 is placed over the edges of the brake shoe retainer lock 18 on the side having the open ends of the brake shoe retainer lock, in this case the bottom as illustrated in Figures 1 and 2. The attacking edges 28 of the tool 20 contact the edges of the brake shoe retainer lock which is to be removed. A sharp blow on the underside of the tool 20 by means of a hammer or other suitable object will then instantly remove the brake shoe retainer lock, and this is so even if the open ends of the brake shoe retainer lock have been tightly crimped into the groove of the shaft 16. It will be noted that the bevels 26 insure ample leeway for expansion of such ends of the spring clip retainer lock as it is being forcibly driven from the member 16.

Since many mechanics crimp the brake shoe retainer lock until the two outer ends are folded tightly down into the retaining groove of the shaft 16 it has always been a problem to remove these brake shoe retainer locks without damage to and mutilation of the lock. Use of the tool of the present invention has shown that brake shoe retainer locks may be removed quickly and easily without any damage whatsoever to the brake shoe retainer lock. Prolonged use of the tool of the present invention may result in the attacking edges 28 becoming somewhat dulled or burred, but when this occurs it is only necessary to resharpen the attacking edges 28 by dressing back the front forward face of sidewall 22 on an emery wheel or suitable grinder, this readily and quickly restores the tool to its former efficiency.

From the above and from the showing in the drawing, particularly Figs. 1 and 2 thereof, it will be realized that my new method or removing spring clip retainer locks from automotive brake assemblies involves the straddling of the spring clip across but backwardly from its open end with the U-shaped head of a hand tool which is equipped with such a head whose U-slot is slightly less in width than the maximum width of the spring clip taken across and backwardly from the latter's open end, such tool having relatively sharp attacking edges extending from the termini of the slot-defining members longitudinally inwardly of the slot, and being held with the plane of the head of the tool extending angularly outwardly from the plane of the spring clip, so that the attacking edges engage the sides of the spring clip and are directed toward the closed end thereof. Following positioning of the tool in this manner, the head of the tool is sharply struck in a direction toward the closed end of the spring clip, thereby almost instantaneously dislodging such spring clip from its retaining position in the assembly.

It is to be understood that the forms of the invention herein shown and described are to be taken as preferred and practical embodiments of the same, and that various changes may be made in the size, shape and arrangement of parts without departing from the spirit of the invention or the scope of the appended claim.

Having thus described the invention, what I claim and desire to secure by Letters Patent is:

A hand tool for driving spring clip retainer locks from retaining position, comprising a driving head formed with a slot which defines a U shape for such head and being of material and having thickness capable of resisting a sharp driving blow exerted against one of its slotted faces, said head being adapted to straddle a spring clip retainer lock, with its slot-defining members engaging opposite sides of said lock; mutually opposing, longitudinally parallel, slot-defining faces extending longitudinally inwardly of said head from the open end of the slot and from intersection with the free terminal ends of said slot-defining members, so that the work-engaging corners are sharp, said slot-defining faces being beveled transversely thereof, from one of the slotted faces of said head to the other, thereby making the slot narrower at one of said slotted faces of the head than at the other for enabling the slot to accommodate spreading legs of the retainer lock during the driving operation, the faces of the said free terminal ends of the slot-defining members being beveled inwardly of the head, from the said narrower slotted face thereof to the opposite slotted face thereof; and retainer lock engaging edges formed at the respective intersections of the narrower slotted face of said head with the said slot-defining faces, the said narrower face of the driving head being beveled from the respective intersections thereof with the said slot-defining faces and toward the said opposite slotted face of the head, for accentuating the sharpness of the said retainer lock engaging edges.

References Cited in the file of this patent

UNITED STATES PATENTS

| | | |
|---|---|---|
| 223,211 | Allen | Jan. 6, 1880 |
| 511,446 | Montgomery | Dec. 26, 1893 |
| 864,223 | Behr | Aug. 27, 1907 |
| 1,279,017 | Schnabel | Sept. 17, 1918 |
| 1,589,683 | Clinger | June 22, 1926 |
| 1,946,063 | Dodge | Feb. 6, 1934 |
| 2,470,309 | Hepp | May 17, 1949 |
| 2,478,881 | Wayryne | Aug. 9, 1949 |
| 2,506,356 | Hallenborg | May 2, 1950 |